(No Model.)
J. SPENCER.
HORSESHOE.
No. 355,727. Patented Jan. 11, 1887.
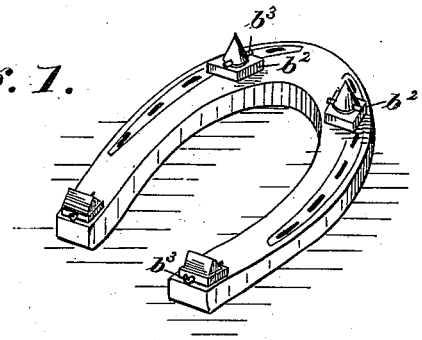
Fig. 1.
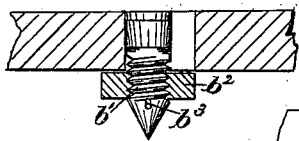
Fig. 2.
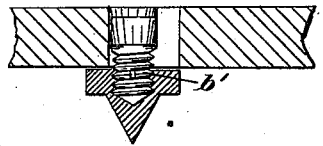
Fig. 5.
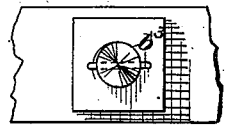
Fig. 4.
Fig. 3.
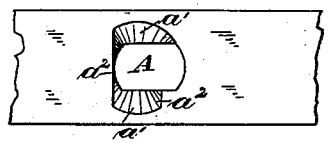
Fig. 6.
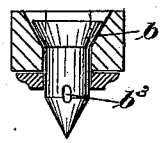
Fig. 7.
Fig. 9.
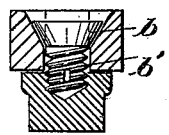
Fig. 10.
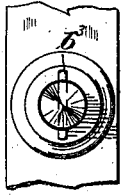
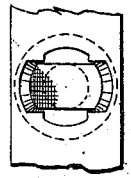
Fig. 8.
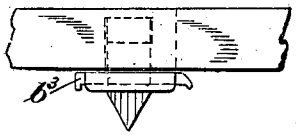
Fig. 11.
Witnesses:
Edward E. Osse,
J. K. E. Diffendrffer.
Inventor
Jervis Spencer

UNITED STATES PATENT OFFICE.

JERVIS SPENCER, OF BALTIMORE COUNTY, MARYLAND.

HORSESHOE.

SPECIFICATION forming part of Letters Patent No. 355,727, dated January 11, 1887.

Application filed April 26, 1886. Serial No. 200,246. (No model.)

*To all whom it may concern:*

Be it known that I, JERVIS SPENCER, of Baltimore county, in the State of Maryland, have invented certain new and useful Improvements in Horseshoes, of which the following is a specification.

My invention consists in the attachment of an adjustable calk to the shoe, as hereinafter more fully described.

In the drawings which accompany this specification, Figure 1 represents a view of the under side of a horseshoe with the calks attached; Fig. 2, part of a horseshoe in section, showing the calk in place secured by a nut which is locked by a pin. Fig. 3 is a view of part of a shoe, showing the side which lies next to the hoof, the opening for the calk, and the socket, with the calk resting within the socket. Fig. 4 is an illustration of part of the lower side of shoe, showing pointed end of calk, the nut, and locking-pin. Fig. 5 is a view of part of a shoe in section, showing the bolt in place, and the calking-point and nut formed in one piece and screwed upon the bolt. Fig. 6 is a view of part of a shoe, showing the side next to the hoof, the shape of the opening, the socket, and countersunk edges of the opening. Fig. 7 is an end section of part of a shoe, showing the calking-piece in position, a pin through the calking-piece, and a washer between the pin and the lower part of the shoe. This view illustrates a modification by which my device may be used dispensing with the nut. Fig. 8 shows a modified form of socket for the calk, running across the opening about midway instead of one side; also the calk in place. Fig. 9 shows a bottom view of the calking-piece, pin, and washer; Fig. 10, an end section of shoe with bolt and flat or square calking-piece screwed thereon; Fig. 11, a side view of part of shoe with calk and nut, and a pin passing through the calking-piece through a groove in the upper part of the nut.

My invention may be described as follows:

Through an ordinary horseshoe I make a hole of the shape and form shown at A, Figs. 3 and 6. Upon the upper side of the shoe I cut out a portion, as shown at $a'$, to enable the upper end of the calking-piece to turn at right angles to its position when inserted, and cut it down a short distance, so that it may form a socket, into which the calking-piece will drop when turned around, and be held in place by the walls of the socket $a^2$.

The calking-piece is formed in the shape of a bolt, the upper part of which is enlarged on one or two sides and beveled so as to fit into the socket of the shoe. The shape of the bolt when viewed on top would be approximately that shown in the orifice A in Figs. 3, 6, and 8. The beveled sides of the enlarged top are shown in Figs. 7 and 10, (marked $b$.) Upon the lower part a thread is cut, (marked $b'$ in the drawings.) Upon this thread is screwed the nut $b^2$.

It will be seen that when a shoe is on the hoof of the horse the calking-piece may be inserted in the hole, pushed up to the top, then turned at right angles and drawn into the socket. In this position it is prevented from turning by the walls of the socket $a^2$, and while in this position the nut is screwed upon the bolt, securing it rigidly in place. The lower part of the bolt protrudes below the nut, and may be squared, flattened, or pointed, as shown in Figs. 1 and 2. A hole through the bolt, about on the line of the lower part of the nut, allows of the insertion of a pin to lock the nut and prevent it from turning while in use.

Instead of applying my invention to use in the exact way above described, I have shown in the drawings several modifications of form. For example, instead of allowing the end of the bolt to protrude below the nut, as shown in Fig. 2, a combined nut and calking-piece may be used, as shown in Figs. 5, 10, and 11. In such cases the calking-piece is screwed to the end of the bolt, and is locked by a pin driven through the bolt between the calking-piece and the lower side of the shoe, passing in a groove in the calking-piece or shoe, or both, placed there for the purpose; or the pin may be dispensed with, allowing the nut alone to hold the calk in place; or the nut may be dispensed with, and a stout pin alone (driven through the bolt just below the shoe) may be used. A washer may be added between the pin and shoe, as shown in Figs. 7 and 9. The socket need not be placed at one end of the aperture in the shoe, but may be located about midway thereof, as shown in Fig. 8.

The calking-piece may be made of steel, and tempered, if desired.

What I claim is—

1. A calking-piece for a horseshoe, made in the form of a bolt, with its upper end enlarged on one or more sides, in combination with a shoe having an aperture of a form to admit the calking-piece in one direction, and having a socket in the upper part of the shoe provided with walls to prevent the calking-piece from turning, into which the enlarged end of the calking-piece will enter when turned, and means below the shoe for fastening and securing the calking-piece rigidly in place, substantially as described.

2. A calking-piece for a horseshoe, made in the form of a bolt, with its upper end enlarged on one or more sides, in combination with a shoe having an aperture of a form to admit the calking-piece, and a socket in the upper part of the aperture to hold the calk in place, and the nut $b^2$, substantially as shown.

3. A calk for a horseshoe, adapted to enter an aperture in the shoe from below, the aperture provided with a socket on the upper side to retain the calking-piece, in combination with the pin $b^3$, passing through the calking-piece below the shoe to secure it.

4. A calking-piece for a horseshoe, consisting of a bolt with an enlarged end, adapted to enter an aperture in the shoe from below, the aperture having a socket on the upper side to retain the enlarged end of the bolt, in combination with a combined nut and calking-piece, as shown.

JERVIS SPENCER.

Witnesses:
ARTHUR STEUART,
WALTER S. WILKINSON.